J. S. CUSTER.
DUPLEX PRESSURE EMERGENCY AND STRAIGHT AIR BRAKE.
APPLICATION FILED MAY 4, 1907.
1,009,286. Patented Nov. 21, 1911.
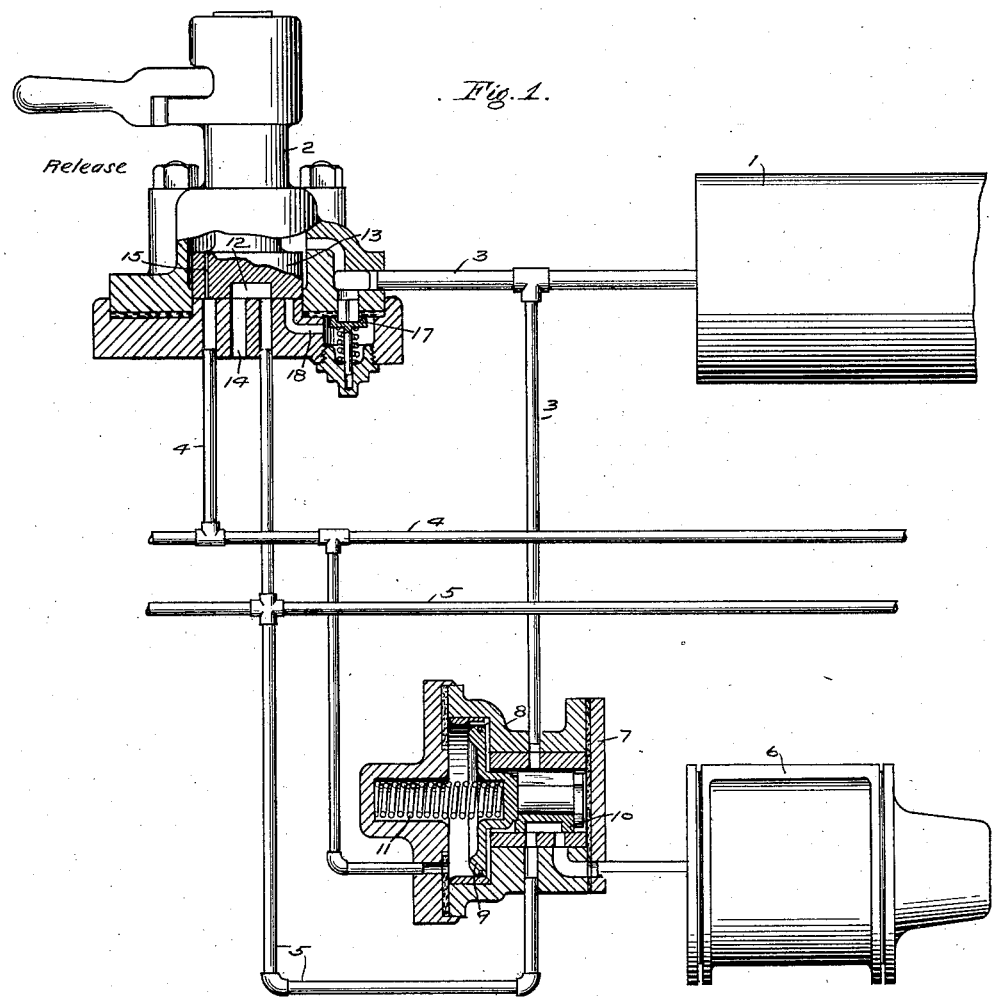
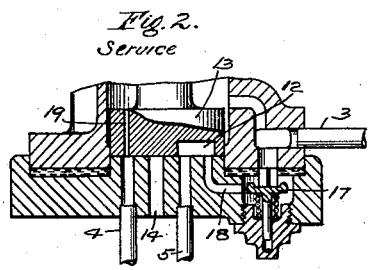
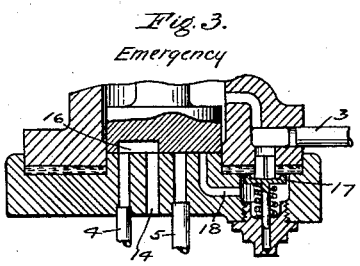
WITNESSES
INVENTOR
Att'y.

UNITED STATES PATENT OFFICE.

JOHN S. CUSTER, OF PITTSBURGH, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

DUPLEX-PRESSURE EMERGENCY AND STRAIGHT-AIR BRAKE.

1,009,286.  Specification of Letters Patent.  Patented Nov. 21, 1911.

Application filed May 4, 1907. Serial No. 371,778.

*To all whom it may concern:*

Be it known that I, JOHN S. CUSTER, a citizen of the United States, residing at Pittsburgh, in the county of Allegheny and State of Pennsylvania, have invented new and useful Improvements in Duplex-Pressure Emergency and Straight-Air Brakes, of which the following is a specification.

This invention relates to combined straight air service and automatic emergency brake apparatus, wherein the maximum degree of pressure admitted to the brake cylinder in direct service applications of the brakes, is limited to a predetermined amount, while in emergency applications, the automatic valve operates to supply air from the reservoir, or source of supply, at a greater maximum pressure, to the brake cylinder. This form of equipment is especially adapted for traction service, such as electric cars, and the principal object of the invention is to provide improved means for limiting the maximum degree of pressure in the brake cylinder in service applications of the brakes, to a degree less than maximum reservoir pressure.

In the accompanying drawing; Figure 1 is a diagrammatic elevation of a portion of a car air brake equipment, embodying one form of my invention, the valve mechanism being shown in vertical section, with the parts in brake release position; Fig. 2 a central sectional view of the motorman's brake valve, showing the relative position of ports when in service position, and Fig. 3 a similar view, showing the relative position of ports in emergency position.

As shown in Fig. 1, the apparatus comprises a reservoir 1, charged with compressed air from a suitable source, a motorman's brake valve 2, communicating with reservoir 1, through pipe 3, and controlling ports to the train pipe 4 and direct or straight air pipe 5, which pipes extend through the car, and are connected to an automatic emergency valve 7, through which air is supplied to and released from the brake cylinder 6.

The emergency valve device may be of the ordinary standard construction comprising a casing 8 containing an emergency piston 9 and valve 10, normally maintained in the extreme inner position, in which the valve 10 establishes communication between the straight air pipe 5 and the brake cylinder, by means of the emergency spring 11.

In brake release position, as shown in Fig. 1, the brake cylinder is open to the atmosphere through the straight air pipe 5, cavity 12 in the rotary valve 13, and exhaust port 14. The train pipe 4 is in communication, through a port 15 in the rotary valve, with the chamber above the same, which is open to reservoir 1 through pipe 3, so that the train pipe is normally charged with air at reservoir pressure.

On movement of the brake valve handle to service position, as shown in Fig. 2, the rotary valve 13 opens communication, through the cavity 12, between the straight air pipe 5 and a passage 18 to a reducing or excess pressure valve 17, which may be of any suitable type and located between the port 18 and the source of supply, or reservoir pipe 3. The reducing valve is set to limit the maximum pressure of air supplied from the reservoir to the desired degree of pressure for service applications. A through port 19 in the rotary valve also connects the supply chamber thereof to the train pipe, so that train pipe pressure may be maintained in service applications of the brakes.

In an emergency application, when the train pipe pressure is suddenly reduced, either by a break-in-two of the train or by manipulation of the brake valve to the position shown in Fig. 3, in which cavity 16 connects the train pipe 4 with exhaust port 14, the emergency piston 9 moves to its extreme outer position, in which valve 10 closes the straight air pipe communication and opens a direct connection from reservoir pipe 3 to the brake cylinder port, so that maximum reservoir pressure is then admitted directly to the brake cylinder.

It has heretofore been proposed to employ a reducing valve in the straight air pipe for limiting the brake cylinder pressure in service applications, but in that case it is also necessary to provide a return by-pass containing a check valve, in order that the air from the brake cylinder may readily exhaust from the straight air pipe to the atmosphere when the brake valve is turned to release position. The location of the reducing valve in the reservoir supply pipe to the brake valve has also been suggested, but this necessitates an additional reservoir connection for the brake valve in order to supply air at full reservoir pressure to the train pipe for charging the same and for releasing the brakes after an automatic emergency application. By locating the reducing valve between the source of supply, or reservoir pipe, and a port from which the brake valve controls the flow to the straight air pipe, air at a higher or full reservoir pressure may be admitted directly to the brake valve chamber and then charged into the train pipe in the release position of said brake valve. By means of this construction, the brakes may be readily released without the use of a return check by-pass, and the train pipe may be charged with air at full reservoir pressure and the emergency valves readily released after an automatic emergency application, without employing any additional pipe connections.

It will now be apparent that I have provided a simple apparatus, whereby the maximum pressure may be limited in service applications of the brakes, while admitting of attaining full reservoir pressure in emergency applications.

Having now described my invention, what I claim as new and desire to secure by Letters Patent, is:—

1. In a combined straight air and emergency brake, the combination with a reservoir, train pipe, brake cylinder, and straight air pipe, of a brake valve for controlling the supply of air to the straight air pipe and having a chamber under reservoir pressure, from which air is supplied to the train pipe, and a reducing valve for limiting the pressure of air supplied to said straight air pipe.

2. In a combined straight air and emergency brake, the combination with a reservoir, train pipe, brake cylinder, and straight air pipe, of a brake valve for controlling the supply of air to the straight air pipe and having a chamber containing fluid at reservoir pressure, from which air is supplied to the train pipe, and a reducing valve for limiting the pressure of air supplied to said straight air pipe in service applications of the brakes.

3. In a combined straight air and emergency brake, the combination with a reservoir, train pipe, brake cylinder, and straight air pipe, of a brake valve for controlling the supply of air to the straight air pipe and having a chamber containing fluid at reservoir pressure and ports for supplying air from said chamber to the train pipe, and a reducing valve for limiting the degree of pressure of air admitted by said brake valve from the reservoir to said straight air pipe.

4. In a combined straight air and emergency brake, the combination with a reservoir, train pipe, brake cylinder, straight air pipe, and emergency valve device, of a brake valve having a valve chamber containing fluid at reservoir pressure and adapted to control the supply of air from said chamber to the train pipe, and a reducing valve for limiting the pressure of air supplied to said straight air pipe through said emergency valve device to the brake cylinder, to a degree less than maximum reservoir pressure.

5. In a combined straight air and emergency brake, the combination with a reservoir, train pipe, brake cylinder, and straight air pipe, of a reducing valve, and a brake valve having a valve chamber constantly open to the reservoir and having means for controlling the supply of air from said chamber to the train pipe and from the reducing valve to the straight air pipe.

6. In a combined straight air and emergency brake, the combination with a reservoir, train pipe, brake cylinder, and straight air pipe, of a reducing valve, and a brake valve, the valve chamber of which communicates with said reservoir and having ports for controlling the supply of air from the valve chamber to the train pipe, from the reducing valve to the straight air pipe, and from the straight air pipe to the exhaust.

7. In a fluid pressure brake, the combination with a train pipe, brake cylinder, and a source of fluid under pressure, of an automatic valve device operating in response to a reduction in train pipe pressure for supplying air to the brake cylinder, a direct passage leading to the brake cylinder, a brake valve having a chamber open to the pressure of fluid from said source, from which air is supplied to the train pipe, and means for limiting the pressure of fluid admitted by the brake valve to said direct passage to a degree less than the maximum pressure of said source.

In testimony whereof I have hereunto set my hand.

JOHN S. CUSTER.

Witnesses:
R. F. EMERY,
WM. M. CADY.

---

Copies of this patent may be obtained for five cents each, by addressing the "Commissioner of Patents, Washington, D. C."